United States Patent [19]
Doyle

[11] Patent Number: 5,973,079
[45] Date of Patent: *Oct. 26, 1999

[54] LARGE PARTICLE GENERATION

[75] Inventor: Thomas R. Doyle, Cranberry Township, Pa.

[73] Assignee: NOVA Chemicals (International ) S.A., Switzerland

[ * ] Notice: This patent is subject to a terminal disclaimer.

[21] Appl. No.: 09/019,879

[22] Filed: Feb. 6, 1998

[51] Int. Cl.$^6$ .................................................. C08F 279/02
[52] U.S. Cl. ............................ 525/316; 525/52; 525/198
[58] Field of Search ............................... 525/316, 52, 198

[56] References Cited

U.S. PATENT DOCUMENTS

| | | | |
|---|---|---|---|
| 4,187,261 | 2/1980 | Slama | 525/243 |
| 4,388,447 | 6/1983 | Iwamoto et al. | 525/316 |
| 4,587,294 | 5/1986 | Matsubara et al. | 525/53 |
| 5,514,750 | 5/1996 | Cantrill et al. | 525/316 |
| 5,550,186 | 8/1996 | Cantrill et al. | 525/52 |

FOREIGN PATENT DOCUMENTS

| | | |
|---|---|---|
| 1160791 | 1/1984 | Canada . |
| 0635525 | 1/1995 | European Pat. Off. . |
| 807177 | 10/1981 | South Africa . |

OTHER PUBLICATIONS

Kirk–Othmer Encyclopedia of Chemical Technology 1983, vol. 21, pp. 822–826.

*Primary Examiner*—James J. Seidleck
*Assistant Examiner*—Olga Asinovsky
*Attorney, Agent, or Firm*—Kenneth H. Johnson

[57] ABSTRACT

Impact modified styrenic polymers having a discontinuous rubber phase having a particle size of at least 4 micrometers may be polymerized in continuous stirred tank reactors, stirred plug flow reactors and continuous stirred loop reactors using an auger agitator.

12 Claims, No Drawings

LARGE PARTICLE GENERATION

FIELD OF THE INVENTION

The present invention relates to a process to improve the properties or balance of properties of impact modified thermoplastic resins. More particularly, the present invention relates to process techniques that produce a relatively large particle size rubber-like composite phase dispersed in a matrix comprising a continuous resin phase.

Impact modified thermoplastic resins containing large particle size rubber-like composite phase find utility in applications such as environmental stress crack resistance, matte surface finishes, lithographic applications or as a component in pellet blends. Alternately, the large particle size syrup can be used in combination with other process techniques and equipment to form a resin with a bimodal particle size distribution. Resins with bimodal particle size distributions find utility in applications requiring a balance between gloss and toughness.

BACKGROUND OF THE INVENTION

The field of the manufacture of impact modified plastics is relatively old and the current industrial processes for their manufacture are fairly well known. According to conventional technology, typically a solution of rubber, typically comprising 1 to about 20, preferably from 3 to 12 weight %, most preferably 4 to 10 weight % of rubber dissolved in one or more monomers is polymerized in a first stage reactor under mechanical agitation. The first stage of the polymerization may be carried out in a batch process or preferably may be carried out in a continuous process. Continuous process configurations would include continuous stirred tank reactors, continuous stirred loop reactors or stirred plug flow reactors.

In the production of high impact polystyrene in a batch process or in a stirred plug flow reactor, initially the rubber-like composite phase is the continuous phase and the resin phase (monomer/resulting polymer phase) is dispersed. Typically, in conventional processes, as the polymerization proceeds in time with a batch reactor or in space with a stirred plug flow reactor at some point between 5 and 20% conversion the system undergoes particulation by phase inversion under the application of a shear field generated by mechanical agitation. That is, the rubber-like composite phase becomes the dispersed phase and the resin phase becomes the continuous phase. This does not happen instantaneously but occurs over a period of time or space, typically from 10 to 50 minutes or reactor space which produces 2 to 8% conversion. That is, the rubber-like composite phase and resin phase become co-continuous for a period of time before the particulation process is complete.

The ternary phase diagram of the styrene-polystyrene-polybutadiene system has been well studied and is well known. For example, the phase diagram and what happens during the polymerization of high impact polystyrene is discussed in Kirk-Othmer Encyclopaedia of Chemical Technology, published in 1983, Volume 21, pages 823 through 826.

In the production of high impact polystyrene in a continuous stirred tank reactor or a continuous stirred loop reactor the rubber phase is particulated by the mechanism of dispersion. That is, the rubber or rubber-like composite phase is quickly dispersed as droplets in a continuous stirred tank or continuous stirred loop reactor that is operated with a continuous resin phase.

Applicants have been able to locate little art relating to processes for making resins that contain a large particle size dispersed phase. Generally in the art the conventional wisdom is that the upper particle size is limited by the need to provide sufficient mixing in the reactors to meet heat transfer requirements and to prevent reactor fouling. Therefore the maximum attainable particle size is system dependent.

Canadian Patent 1,160,791, issued Jan. 17, 1984 to the Dow Chemical Company discloses a process to polymerize a high impact polystyrene (HIPS) having a dispersed phase (rubber phase) particle size of about 3.8 micrometers by including a major amount of a $C_{6-10}$ aliphatic hydrocarbon in the syrup. The present invention does not contemplate inclusion of a major amount of a $C_{6-10}$ aliphatic hydrocarbon in the syrup. Thus Applicants have eliminated an essential feature of the prior art.

U.S. Pat. No. 4,187,261, issued Feb. 5, 1980, assigned to Standard Oil Company teaches a similar approach to preparing a HIPS having a large particle size. According to the reference the polymerization is carried out at a relatively low conversion so there is excess monomer in the syrup when it is devolatilized. In effect this may act as a hydrocarbon solvent/diluent. The particle size is up to 9 micrometers. Again the process of the invention is directed to a chemical method rather than a mechanical method of producing such a large particle size distribution.

South African patent publication 811001 assigned to BASF discloses a bulk suspension process using high amounts of rubber (28%) in a styrenic phase. The dispersed phase particles have a size of about 4.5 micrometers. The present invention does not contemplate such a high content of rubber or the use of a suspension process.

U.S. Pat. No. 4,388,447 issued Jun. 14, 1983, assigned to Mitsui Toatsu Chemicals, Inc. teaches a process for producing rubber modified styrenic resins in which the rubbery phase including rubber-like polymer is transformed into dispersed particles in a stirred tank reactor having both a helical blade agitator mounted in a draft tube and an auxiliary agitator. Comparative example 3 discloses the use of the helical blade agitator in a draft tube without the use of an auxiliary agitator. The present invention does not contemplate the presence of an auxiliary agitator nor does it contemplate the presence of a draft tube. That is, in accordance with the present invention the auger agitator is used without, or in the absence of, a draft tube.

U.S. Pat. No. 4,587,294 issued May 6, 1986, assigned to Mitsui Toatsu Chemicals, Inc. and Toyo Engineering Corporation teaches a process for the manufacture of ABS in which the reactor in which phase inversion takes place has a screw type agitator mounted in a draft tube in conjunction with an auxiliary agitator at the bottom. As noted above, the present invention does not contemplate the presence of an auxiliary agitator nor does it contemplate the presence of a draft tube.

The present invention seeks to provide a mechanical means to prepare a syrup having a volume average particle size distribution of greater than 4, preferably greater than 6, most preferably not less than 8 micrometers.

SUMMARY OF THE INVENTION

The present invention provides a process to produce a syrup comprising a continuous phase of one or more monomers selected from the group consisting of $C_{8-12}$ vinyl aromatic monomers which are unsubstituted or substituted by a $C_{1-4}$ alkyl radical, $C_{1-8}$ alkyl esters of acrylic or methacrylic acid, maleic anhydride, acrylonitrile and methacrylonitrile and polymer formed therefrom and from 1 to 20 weight % of a polymer which forms a discontinuous phase having a volume average diameter of at least 4 micrometers, selected from the group consisting of:
(i) co- or homopolymers of $C_{4-6}$ conjugated diolefins;
(ii) random, block and tapered copolymers comprising from 10 to 80 weight % of one or more $C_{8-12}$ vinyl aromatic monomers which are unsubstituted or substituted by a $C_{1-4}$ alkyl radical, and from 20 to 90 weight % of one or more $C_{4-6}$ conjugated diolefins; and
(iii) copolymers comprising from 5 to 50 weight % of acrylonitrile or methacrylonitrile, and from 50 to 95 weight % of one or more $C_{4-6}$ conjugated diolefins,
which comprises dissolving the polymers forming the discontinuous phase in one or more of the monomers forming the continuous phase and polymerizing the resulting syrup under low shear to a percent conversion greater than the weight % of the polymer forming the discontinuous phase in said solution but less than 75% conversion, preferably less than 40% conversion, to cause phase inversion and separation of the discontinuous phase in a reactor selected from the group consisting of continuous stirred tank reactors, continuous stirred loop reactors and stirred plug flow reactors wherein the agitation in said reactor consists solely of an auger agitator, in the absence of a draft tube, said auger having a shaft forming from ½ to ¹⁄₂₀ of the cross section area of the agitator and flights forming the balance of the cross section area, said flights having a pitch defined by the equation $\alpha^0 = \text{Tan}^{-1}\ 0.5\ p/d$ wherein p is the pitch distance and d is the screw diameter (this may range from about 5 to 45°).

In a further aspect of the present invention the syrup may be further polymerized and devolatilized during which the dispersed phase becomes crosslinked.

DETAILED DESCRIPTION

The syrups which may be further polymerized to form impact modified polymers and the impact modified polymers per se, which may be prepared in accordance with the present invention include high impact polystyrene (HIPS), acrylonitrile butadiene styrene polymers (ABS), and methyl methacrylate butadiene styrene polymers (MBS). The monomers useful in accordance with the present invention for the formation of the thermoplastic polymer or the final continuous phase may be selected from the group consisting of $C_{8-12}$ vinyl aromatic monomers which are unsubstituted or substituted by a $C_{1-4}$ alkyl radical, $C_{1-8}$ alkyl esters of acrylic or methacrylic acids, maleic anhydride, acrylonitrile, and methacrylonitrile.

Suitable $C_{8-12}$ vinyl aromatic monomers which are unsubstituted or substituted by a $C_{1-4}$ alkyl radical include styrene, α-methyl styrene, p-methyl styrene, and p-t-butyl styrene. Useful $C_{1-8}$ alkyl esters of acrylic or methacrylic acids include methyl methacrylate, ethyl methacrylate, methyl acrylate, ethyl acrylate, and ethylhexyl acrylate.

The resin component in the impact modified thermoplastic may comprise a co- or homo-polymer of one or more $C_{8-12}$ vinyl aromatic monomers which are unsubstituted or substituted by a $C_{1-4}$ alkyl radical. A suitable resin includes polystyrene. However, the resin may be a copolymer comprising from 5 to 95, preferably from 50 to 90 weight % of one or more $C_{8-12}$ vinyl aromatic monomers and from 95 to 5, preferably from 50 to 10 weight % of one or more monomers selected from the group consisting of $C_{1-8}$ alkyl esters of acrylic or methacrylic acids, maleic anhydride, acrylonitrile, and methacrylonitrile. Typically such polymers are copolymers of styrene and one or more monomers selected from the group consisting of acrylonitrile, methacrylonitrile, methyl acrylate, ethyl acrylate, methyl methacrylate, ethyl methacrylate, butyl acrylate, butyl methacrylate, ethylhexyl acrylate and maleic anhydride. The resin may be a homo- or co-polymer of one or more $C_{1-8}$ alkyl esters of acrylic or methacrylic acids, preferably those listed above.

When finally finished the resin polymers should have a number average molecular weight greater than 65,000 preferably greater than 70,000 for the styrene containing polymers and a number average molecular weight of greater than 30,000 for the predominantly ester polymers.

The rubbers which may be used as impact modifiers which form the final dispersed phase in the syrup and resins of the present invention will typically have a weight average molecular weight (Mw) of greater than about 150,000, preferably greater than 200,000. Block rubber copolymers have significantly lower Mw, typically greater than 50,000. The rubbers may be selected from the group consisting of:
(i) co- or homopolymers of $C_{4-6}$ conjugated diolefins which are unsubstituted or substituted by a halogen atom, preferably a chlorine or bromine atom;
(ii) random, block, linear, star and tapered copolymers comprising from 10 to 80 weight % of one or more $C_{8-12}$ vinyl aromatic monomers which are unsubstituted or substituted by a $C_{1-4}$ alkyl radical, from 20 to 90 weight % of one or more $C_{4-6}$ conjugated diolefins; and
(iii) copolymers comprising from 1 to 50 weight % acrylonitrile or methacrylonitrile and, from 50 to 99 weight % of one or more $C_{4-6}$ conjugated diolefins.

Suitable polymers which are co- or homopolymers of $C_{4-6}$ conjugated diolefins include homopolymers of butadiene and copolymers of butadiene and styrene (styrene butadiene rubbers or SBR) or copolymers of butadiene and acrylonitrile (nitrile rubbers). Preferably the polymer will be a homopolymer of butadiene. Generally such homopolymers have a level of stereospecificity. The selection of the degree of stereospecificity will depend to some extent upon the properties required in the final product. Some polybutadienes contain over 90, most preferably over 95 weight % of monomer in the cis configuration. Such a type of polymer is commercially available from Bayer under the trademark TAKTENE® 1202. The polybutadiene may contain a lower amount, typically from 30 to 50, most preferably about 35 to 45 weight % of monomer in the cis configuration, such as polymers which are available from Firestone under the trademark DIENE® 55 or from Bayer under the trademark TAKTENE® 550. DIENE® 55 and TAKTENE® 550 are known as medium cis, medium viscosity polybutadienes. Other grades of polybutadienes are available. DIENE® 70 and TAKTENE® 710 are known as medium cis, high viscosity polybutadienes. DIENE® 35 and TAKTENE® 380 are known as medium cis, low viscosity polybutadienes.

Suitable rubbery polymers may comprise: from 10 to 80, preferably from 20 to 50 weight % of one or more $C_{8-12}$ vinyl aromatic monomers which are unsubstituted or substituted by a $C_{1-4}$ alkyl radical, and from 20 to 90, preferably from 50 to 80 weight % of one or more $C_{4-6}$ conjugated diolefins. Such rubber polymers may be random or block such as linear block, star block or tapered block polymers.

Random copolymers having the above composition are the commercially available styrene butadiene rubbers (SBR). A number of block copolymers are available from Shell under the trademark KRATON®.

The rubbery polymer may comprise from 1 to 50, preferably from 5 to 35 weight % of acrylonitrile or methacrylonitrile and, from 50 to 99, preferably from 95 to 65 weight % of one or more $C_{4-6}$ conjugated diolefins.

The above polymers are the commercially available nitrile rubbers available from Bayer under the trademark KRYNAC® and from Bayer AG under the trademark PERBUNAN®.

It should be kept in mind that the rubber should be soluble in one or more of the monomers of the thermoplastic or the diluent or solvent for the monomers. The solubility of the above rubbers in various monomers and/or diluents or solvents may be easily determined by non-inventive routine testing.

Typically, from about 1 to 20, preferably from about 3 to 12, most preferably from 4 to 10 weight % of the rubber is dissolved in the monomer or a mixture of monomers to form a syrup.

Typically the initial syrup consists essentially of rubber dissolved in monomer and optionally a small amount typically less than 10 weight % of diluent or solvent such as ethylbenzene. The syrup is fed to a reactor and polymerized under low shear. This results in the formation of a syrup in which the rubbery phase is dispersed and has a relatively large particle size. In the case of the present invention an auger (screw) agitator is used in either a stirred plug flow reactor, a continuous stirred tank reactor or a continuous stirred loop reactor. Stirred plug flow and continuous stirred loop reactors typically have L:D ratios greater than 3:1 and preferably greaterthan 5:1. Continuous stirred tank reactors typically have L:D ratios less than 3:1 and preferably less than 2:1.

In the present invention the auger or screw agitator, comprises a central shaft having a relatively small cross-section compared to the cross-section of the screw, and a flight comprising a relatively larger portion of the cross-section area of the auger or screw. Typically the shaft would be from about ½ to ¹⁄₂₀ of the cross-sectional area of the screw or auger and the flight would comprise the remaining ½ to ¹⁹⁄₂₀ of the cross-sectional area. The pitch of the flight, α, is defined as: α°=Tan⁻¹ (0.5*p/d), where p=the pitch distance and d=the screw diameter. This may range from about 5 to 45°.

The speed of rotation of the screw should be low enough to avoid high shear rates, which will cause the dispersed particles to be small in size. However, the speed of rotation should be high enough to avoid reactor fouling and provide sufficient mixing for heat transfer requirements of the polymerization. Typically the speed of rotation will be less than about 50, preferably less than 30, most preferably less than 20 RPM. The speed of rotation of the agitator to produce a desired particle size may be determined by routine non-inventive testing.

After polymerization to a sufficiently high conversion, typically above about 75%, the syrup may be finished in a conventional manner. That is, it may be passed through a devolatilizer (where the rubber is crosslinked) such as a single or two stage falling strand devolatilizer and then extruded as strands, cooled (in a water bath) and chopped into pellets.

Conventional additives such as anti-oxidants heat and light stabilizers, and lubricants (extrusion aids/mold release aids) may be added at a number of points well known to those skilled in the art depending upon the additives, such as to the system (e.g. to the reactants), or prior to the devolatilizer or by subsequent melt blending.

A useful indication of particle size is reflected by the volume average particle diameter. The volume average particle diameter is given by the ratio of the fourth moment of the particle size distribution to the third moment of the particle size distribution.

$$\text{Volume Average diameter} = \frac{\sum n_i d_i^4}{\sum n_i d_i^3}$$

wherein $n_i$ is the number of all particles having diameter $d_i$ summed over all particle diameters.

Often, but not invariably, the dispersed particles have a log normal distribution and the particle size density is given by:

$$p(x) = \frac{1}{\sqrt{2\pi}\,\sigma x}\exp\left(-0.5\left(\frac{\ln x - \mu}{\sigma}\right)^2\right)$$

where $p(x)$ is the particle density at diameter x, $\mu$ is a parameter indicating the location of the distribution, and $\sigma$ is a parameter indicating the spread or breadth of the distribution. In cases where the particle size distribution is log normal these two parameters, $\mu$ and $\sigma$, uniquely determine the distribution.

The large particle size impact modified resin may be fabricated into articles using conventional processing equipment. It may also find utility as a component in a blend. One application would be to form a salt and pepper blend with a small particle size containing resin for applications requiring a balance between gloss and impact strength.

The large particle size syrup can also be used in combinations with other process technology. One example would be to treat the large particle size syrup, before the devolatilization step, in a uniform shear field generator to reduce the particle size of the dispersed phase. This reduced particle size syrup can then be further polymerized and devolatilized to give the final resin. Another option is to divide the large particle size syrup at some point before devolatilization into two or more portions and to treat one or more of these portions to a uniform shear field generator to reduce the dispersed phase particle size. The syrup streams can then be recombined, further polymerized and devolatilized to give a bi- or multi-modal particle size resin. The disclosure of such subsequent treatment and a uniform shear field device is the subject matter of U.S. Pat. No. 5,550,186.

Another example of the utility of an auger agitator for the generation of a large particle size syrup would be in the production of resins with bimodal particle size distributions. Two or more first stage reactors can be operated in parallel, one producing a large particle size syrup (using an auger agitator) and the other producing a small particle size syrup (using a higher shear agitator, such as an anchor agitator). The syrups containing the different size particles can be blended to give a syrup with a bi- or multi-modal particle size distribution. The syrup can then be further polymerized and devolatilized to give resins with bi- or multi-modal particle size distributions.

The present invention will be illustrated by the following examples which are not intended to limit the invention. In the examples, unless otherwise indicated, parts means parts by weight and % means weight %.

GENERAL PROCEDURES

Particle Size Measurement:

Particle size analysis was done using two methods, photosedimentation and laser diffraction. The photosedimentation method reports a volume average particle size and is listed in Tables III and VI as Ph. Sed. The laser diffraction method reports a volume medium particle size and is listed in Tables III and VI as La. Dif. The two different measurement techniques gave comparable results.

Syrup Solids:

Syrup solids were determined using gravimetric analysis by devolatilizing the samples in a vacuum oven at elevated temperature and reduced pressure.

Continuous Stirred Tank Reactors:

Two continuous stirred tank reactors were used in the experiments, R445 and R450. Both were used as first stage reactors in which the syrup typically exited the reaction vessel containing 20 to 40% solids.

The following describes R445 and R450, both of which had L/D ratios of 1:5. R445 had a diameter of 11.05 cm (4.35 inches), a length of 16.56 cm (6.52 inches) and a free volume of 1588 ml. R450 had a diameter of 13.46 cm (5.30 inches), a length of 20.19 cm (7.95 inches) and a free volume of 2874 ml. The vessels did not contain a draft tube. The vessels had external heating jackets with two ports to flow hot oil through and were connected to heating/circulating oil baths to provide temperature control. The top of the reactor was removable and equipped for mechanical agitation. A drive shaft passed through a seal in the top of the reactor. One end of the drive shaft was attachable to an electric motor and the other end was attachable to an agitator. Different agitator designs were used and are specified in the examples. The following describes the auger agitator used in R445: screw diameter=10.41 cm (4.10 inches), root diameter=2.54 cm (1.0 inch), screw pitch=5.08 cm (2.0 inches), and flight pitch=13.7°. The following describes the auger agitator used in R450: screw diameter=12.83 cm (5.05 inches), root diameter=2.54 cm (1.0 inch), screw pitch=5.08 cm (2.0 inches) and flight pitch=11.2°. Batch (syrup) temperature was measured about midway between the agitator shaft and the vessel wall and about ⅓ down from the top of the vessel. The temperature in all transfer lines was controlled. The entire reactor was made from stainless steel.

Stirred Plug Flow Reactors:

Two stirred plug flow reactors of identical design were used in the experiments, R455 and R460. R455 was used as a first stage reactor in which the syrup typically exited the reaction vessel containing 20 to 40% solids. R460 was used as a second stage reactor in which the syrup typically exited the vessel containing 60 to 85% solids.

The following describes R455 and R460. Each reactor consisted of three modules 16 cm (6.3 inches) in length and 5.33 cm (2.1 inches) in diameter and were bolted together through flanges. The reactors had a free volume of 1072 ml. The reactors did not contain a draft tube. Each reactor module had an external heating jacket with two ports to flow hot oil through and were connected to heating/circulating oil baths to provide individual temperature control for each module. The top of the reactor was removable and equipped for mechanical agitation. A drive shaft passed through a seal in the top of the reactor. One end of the drive shaft was attachable to an electric motor and the other end was attachable to an agitator. Different agitator designs were used in R455 and are specified in the examples. The following describes the auger agitators used in R455 and R460: screw diameter=2.16 cm (1.85 inches); root diameter=0.95 cm (0.375 inches); screw pitch=2.54 cm (1.0 inch) and flight pitch=15.1°. Batch (syrup) temperature was measured at the inlet and outlet of each reactor module and recorded. The temperature in all transfer lines was controlled. The entire reactor was made from stainless steel.

Plug Flow Reactor:

R475 was located downstream of R460 and was an unstirred tubular plug flow reactor. The syrup entered the vessel typically containing 60 to 85% solids and exited the vessel containing 65 to 90% solids. A back pressure valve was located at the end of the vessel.

R475 consisted of a single tubular reactor that was 106.68 cm (42 inches) long, had an I.D. of 1.09 cm (0.430 inches) and a volume of 100 ml. The reaction tube was mounted inside a second tube which formed a heating jacket. Hot oil was flowed from a heating/circulating bath through the jacket to provide temperature control.

Preheater:

E480 was located downstream of R475 and was a single tube heat exchanger. A back pressure valve was located just before it. The tube was 38.1 cm (15 inches) long, had an I.D. of 1.09 cm (0.430 inches) and a volume of 36 ml. It was used to heat the syrup before devolatilization. Temperature was measured near the exit of the tube and was controlled using an electric heat tape.

Devolatilizer:

E490 was a falling strand devolatilizer and was mounted on an extruder. The vessel was covered by three electrical heating bands which provided temperature control. Syrup enters the vessel containing 10 to 40% monomer and is extruded as a strand containing 200 to 1000 ppm of monomer. The strand was chopped into pellets using a pelletizer.

Polymerizations:

The feed solution was prepared in a dissolving tank, filtered and transferred to $19 \times 10^{-3}$ m$^3$ (5 gallon) pressure vessels. The feed vessel was placed on a scale and connected to a pressurized manifold. The feed solution was pressured to a pump, which delivered the syrup to the first stage reactor.

The following reactor combinations were used in the examples:

Type I: Feed Solution ⇒R445⇒Syrup
Type II: Feed Solution⇒R445⇒R460⇒R475⇒E480 ⇒E490⇒Finished Product (pellets)
Type III: Feed Solution⇒R450⇒R460⇒R475⇒E480 ⇒E490⇒Finished Product (pellets)
Type IV: Feed Solution⇒R455⇒Syrup
Type V: Feed Solution⇒R455⇒R460⇒R475⇒E480 ⇒E490⇒Finished Product (pellets)

The general procedure involved setting all the input variables and waiting a sufficient amount of time for the system to attain equilibrium. This was at least three times the system residence time. Syrup solids were monitored during the experiment and were used to assess the steady state condition.

In the Type I and IV polymerization systems the syrup samples were collected in tubes from R445 or R455. The tubes containing the syrup were placed in an oil bath at 140° C. for 24 hours. After this treatment about 98% of the styrene was converted to polymer and the samples were isolated as plugs. The plugs were sliced into wafers and chopped into small pieces. The pieces were devolatilized in a vacuum oven at 220° C. and reduced pressure (~1 mm Hg) for 30 minutes. This produced a material which contained 500 to 700 ppm styrene. This advancement procedure is referred to as "tube" in Tables III and VI.

In the Type II, III and V polymerization systems the samples are continuously collected as finished pellets. These materials typically contain between 500 to 800 ppm styrene, which depends on the process conditions. This advancement procedure is referred to as "process" in Table III and VI.

The particle size of the materials was largely determined by the conditions in the first stage reactor. Hence the "tube" or "process" finishing procedures has little effect on the measured particle size in these experiments.

The details of the experiments are listed in the examples.

EXAMPLE ONE

This example illustrates the utility of the auger agitator for mixing in a continuous stirred tank reactor. The system utilized an open loop control scheme and the oil jacket temperature was held constant. This allowed an assessment of mixing by measuring batch temperature and syrup solids.

Experiment run numbers 1 to 5 used the Type I polymerization system. R445 was equipped with an anchor agitator and two baffles, which were 180° apart. The feed syrup comprised 9.3% Taktene 550 and used 0.028% t-butylperoxyacetate for initiation. The agitator was operated at various speeds. The conditions and results are listed in Table I.

Experiment run numbers 6 to 9 used the Type I polymerization system. R445 was equipped with an auger agitator. The feed syrup comprised 6.0% Taktene 550 and used thermal initiation. The agitator was operated at various speeds. The conditions and results are listed in Table I.

Experiment run numbers 10 and 11 used the Type II polymerization system. R445 was equipped with an auger agitator. The feed syrup comprised 6.0% Taktene 550, 1.0% mineral oil and used 0.028% t-butylperoxyacetate for initiation. The conditions and results are listed in Table I.

Experiment run numbers 1 and 10 show for a similar reaction system there is a much larger difference between the batch and oil jacket temperature for the anchor than the auger agitator. Further, experiment 11 shows even at high reaction rates the auger agitator results in a smaller difference between the batch and jacket temperatures when compared to the anchor agitator.

Example one shows that the auger agitator is effectively mixing a continuous stirred tank reactor at low speeds of operation and high reaction rates. Further, the results indicate the auger agitator would find utility in producing HIPS resins with large particle sizes, since it can be operated at low speeds and inputs low shear stress into the syrups.

EXAMPLE TWO

This example shows the utility of the auger agitator in a continuous stirred tank reactor for generating impact modified thermoplastic resins with large particle sizes.

Experimental run numbers 1, 6 and 7 used the Type I reactor system for polymerizations. Experimental run num-

TABLE I

EXPERIMENTAL CONDITIONS AND RESULTS FOR EXAMPLE ONE

| Run Number | Feed Rate (ml/hr) | R445 Agitator rpm/Type | Oil Jacket Temp. (° C.) | Batch Temp. (° C.) | Solids (%) | Reaction Rate (% Conv./hr) |
|---|---|---|---|---|---|---|
| 1 | 652 | 30/Anchor | 105.0 | 118.2 | 36.88 | 13.21 |
| 2 | 652 | 45/Anchor | 105.0 | 115.6 | 32.78 | 11.25 |
| 3 | 652 | 60/Anchor | 105.0 | 113.4 | 30.02 | 9.92 |
| 4 | 652 | 90/Anchor | 105.0 | 111.9 | 26.69 | 8.32 |
| 5 | 652 | 150/Anchor | 105.0 | 112.4 | 25.36 | 7.69 |
| 6 | 652 | 15/Auger | 130.0 | NA | 25.90 | 10.43 |
| 7 | 652 | 30/Auger | 130.0 | 129.0 | 26.91 | 10.96 |
| 8 | 652 | 60/Auger | 130.0 | 129.5 | 27.00 | 11.01 |
| 9 | 652 | 120/Auger | 130.0 | 130.2 | 29.37 | 12.25 |
| 10 | 652 | 30/Auger | 110.0 | 111.1 | 25.50 | 9.47 |
| 11 | 978 | 30/Auger | 115.0 | 117.1 | 29.80 | 17.82 |

Experiment run numbers 1 to 5 show the sensitivity of batch temperature and reaction rate to changes in agitator speed for the anchor agitator. By comparison run numbers 6 to 9 show the relative insensitivity of batch temperature and reaction rate to changes in agitator speed for the auger agitator. In addition there is a larger difference between the batch and oil jacket temperatures for the anchor than the auger agitator.

bers 12 to 19 used the Type III reactor system for polymerizations. The independent variables are listed in Table II. Two types of initiation were used: 0.028% t-butylperoxyacetate "init." and thermal "ther". Two types of rubber were used: Taktene 550 "T-550" and Diene 35 "D-35". The response variables are listed in Table III.

TABLE II

EXPERIMENTAL CONDITIONS FOR EXAMPLE II

| Run Number | Vessel Tag | Agitator Type/Speed (rpm) | Feed Rate (ml/hr) | Feed Composition Rubber (%) | Type | Min. Oil (%) | Initiation Type | Oil Jacket Temp. (° C.) |
|---|---|---|---|---|---|---|---|---|
| 1 | R445 | Anchor/30 | 652 | 9.3 | T-550 | 0 | Init. | 105 |
| 6 | R445 | Auger/15 | 652 | 6.0 | T-550 | 0 | Ther. | 130 |
| 7 | R445 | Auger/30 | 652 | 6.0 | T-550 | 0 | Ther. | 130 |
| 12 | R450 | A-A/30 | 1226 | 6.5 | T-550 | 1.5 | Init. | 110.4 |
| 13 | R450 | Anchor/30 | 1226 | 6.5 | T-550 | 1.5 | Init. | 109.1 |
| 14 | R450 | Auger/30 | 1226 | 6.0 | T-550 | 1.5 | Init. | 110.1 |
| 15 | R450 | Auger/30 | 1226 | 6.0 | T-550 | 1.5 | Init. | 107.9 |
| 16 | R450 | Auger/30 | 1226 | 6.0 | D-35 | 1.5 | Init | 110.1 |
| 17 | R450 | Auger/15 | 1226 | 6.0 | D-35 | 1.5 | Init | 107.7 |
| 18 | R450 | Auger/15 | 1226 | 6.0 | D-35 | 1.5 | Ther. | 125.8 |
| 19 | R450 | Auger/30 | 1226 | 6.0 | D-35 | 1.5 | Ther. | 125.9 |

A—A refers to an anchor-auger agitator, which is an auger agitator modified with anchor blades at the outer diameter of the screw flight.

TABLE III

EXPERIMENTAL RESULTS FOR EXAMPLE II

| Run Number | Batch Temperature (° C.) | Solids (%) | Reaction Rate (%/hr) | Sample Prep. | Particle Size Test Method | μM |
|---|---|---|---|---|---|---|
| 1 | 118.2 | 36.88 | 13.21 | Tube | Ph. Sed. | 3.6 |
| 6 | NA (~129° C.) | 25.90 | 10.43 | Tube | Ph. Sed. | 10.6 |
| 7 | 129.0 | 26.91 | 10.96 | Tube | Ph. Sed. | 6.0 |
| 12 | 115.8 | 30.92 | 11.99 | Process | La. Diff. | 3.1 |
| 13 | 115.4 | 32.70 | 12.89 | Process | La. Diff. | 7.8 |
| 14 | 116.6 | 33.05 | 13.39 | Process | La. Diff. | 7.8 |
| 15 | 111.1 | 25.94 | 9.83 | Process | La. Diff. | 4.8 |
| 16 | 119.5 | 33.51 | 13.41 | Process | La. Diff. | 7.7 |
| 17 | 113.5 | 26.12 | 9.41 | Process | La. Diff. | 5.6 |
| 18 | 133.1 | 30.49 | 12.31 | Process | La. Diff. | 8.0 |
| 19 | 132.5 | 31.13 | 12.19 | Process | La. Diff. | 6.5 |

Experiment run number one shows even under conditions that favor large particle sizes (low agitator speed, high solids and high reaction rate), the particle size of the resins produced by the anchor agitator were relatively small.

Experiment run numbers six and seven shows the utility of the auger agitator in generating resins with large particle sizes. Further, the dependence of particle size on agitator speed is illustrated and the use of the auger agitator at low speeds results in the formation of large particles under commercially interesting polymerization conditions.

Experiment run number 12 shows the relatively small particle size resin generated by the anchor-auger agitator. By comparison, run number 13 shows the large particle size of the resin generated by the auger agitator under similar experimental conditions.

Experiment run numbers 14 and 15 illustrate the dependence of particle size on solids and reaction rate. The particle size of a resin depends on many interacting system variables. For a given polymerization system, the auger agitator (versus the use of other agitator designs) should produce the largest particle size resin.

Experiment run numbers 16 to 19 illustrate the dependence of particle size on a number of process variables. In these cases a low viscosity medium cis rubber generated resins with large particle sizes. As the rubber viscosity increases the particle size typically becomes larger. Comparative examples 1, 6, 7, and 12 to 15 all used a medium viscosity medium cis rubber. It would be expected that if comparative examples using a high viscosity medium cis rubber were run even larger particle sizes would be achieved.

Example two illustrates the utility of the auger agitator for generating large particle size resins in a continuous stirred tank reactor under typical commercial polymerization conditions.

EXAMPLE 3

This example illustrates the utility of an auger agitator for mixing in a stirred plug flow reactor. The system utilized an open loop control scheme and the oil jacket temperature was held constant. This allowed an assessment of mixing by measuring batch temperature and syrup solids.

Experiment run numbers 20 to 26 used the Type IV polymerization system. R455 was equipped with an anchor agitator. The feed syrup comprised 8.0% Taktene 550, 0.5% mineral oil and utilized thermal initiation. In cases where gel was found in the reactor the maximum solids and reaction rate is reported. This was done since a true steady state was never reached. The conditions and results are listed in Table IV.

Experiment run numbers 27 to 31 used the Type IV polymerization system. R455 was equipped with an auger agitator. The feed syrup comprised 6.0% Taktene 550 and utilized thermal initiation. The conditions and results are listed in Table IV.

Experiment run number 32 used the Type V polymerization system. R455 was equipped with an auger agitator. The feed syrup comprised 6.5% Taktene 550 and utilized thermal initiation. The conditions and results are listed in Table IV.

TABLE IV

EXPERIMENTAL CONDITIONS AND RESULTS FOR EXAMPLE III

| Run Number | Feed Rate (ml/hr) | R455 Agitator Speed/Type/Wall Clearance | Temperature (° C.) Oil | Temperature (° C.) Batch | Solids (%) | Run Time (hrs) | Gel in Reactor yes/no | Reaction Rate (% Conv./hr) |
|---|---|---|---|---|---|---|---|---|
| 20 | 435 | 20/Anchor/0.125 | 125.0 | 122 | 24.60 | 10 | no | 7.2 |
| 21 | 435 | 20/Anchor/0.125 | 130.0 | 131 | 35.60 | 10 | yes | 12.0 |
| 22 | 435 | 40/Anchor/0.125 | 130.0 | 132 | 36.77 | 10 | yes | 12.5 |
| 23 | 435 | 20/Anchor/0.25 | 125.0 | 120 | 23.89 | 8 | no | 6.4 |
| 24 | 435 | 30/Anchor/0.25 | 125.0 | 120 | 22.82 | 8 | no | 6.9 |
| 25 | 435 | 30/Anchor/0.25 | 130.0 | 137 | 46.96 | 10 | yes | 16.9 |
| 26 | 435 | 40/Anchor/0.25 | 130.0 | 140 | 54.41 | 10 | yes | 20.2 |
| 27 | 652 | 15/Auger/0.125 | 130.0 | 133.9 | 31.98 | 8 | no | 19.38 |
| 28 | 652 | 30/Auger/0.125 | 130.0 | 132.0 | 28.34 | 8 | no | 16.76 |
| 29 | 652 | 45/Auger/0.125 | 130.0 | 131.5 | 26.75 | 8 | no | 15.61 |
| 30 | 652 | 60/Auger/0.125 | 130.0 | 131.3 | 25.24 | 8 | no | 14.51 |
| 31 | 652 | 120/Auger/0.125 | 130.0 | 131.0 | 24.91 | 8 | no | 14.26 |
| 32 | 876 | 30/Auger/0.125 | 135.0 | 138.0 | 32.04 | 96 | no | 26.69 |

Examples 20 to 26 shows that gel formation was not an issue at low rates of polymerization, but became a problem at moderate polymerization rates.

Examples 27 to 31 show that gel formation was not observed when an auger agitator was used at moderate to high rates of polymerization. Further, the batch temperature spread was much less for the auger agitator over a larger range of agitator speeds when compared to the anchor agitator runs. This indicates good mixing by the auger agitator.

Example 32 shows that at even high rates of polymerization, low agitator speeds, and long operating times, gel formation was not observed when an auger agitator was used. Further, the difference between the average batch temperature and the oil jacket temperature was small, indicating that the vessel was well mixed Example three shows that the auger agitator was effectively mixing a stirred plug flow reactor at low speeds of operation and high reaction rates. Further, the results indicate the auger agitator would find utility in producing HIPS resins with large particle sizes, since it can be operated at low speeds and inputs low shear stress into the syrups.

EXAMPLE 4

This example shows the utility of the auger agitator in a stirred plug flow reactor for generating impact modified thermoplastic resins with large particle sizes.

Experimental run numbers 20 to 31 used the Type IV reactor system for polymerizations. Experimental run number 32 used the Type V reactor system for polymerization. The independent variables are listed in Table V. The response variables are listed in Table VI. In Table V, "T-550" stands for Taktene 550 and "Ther." stands for thermal initiation.

Examples 20 and 24 shows that samples with moderate particle sizes are produced under stable reaction conditions (as judged by the absence of gel in the reactor) when an anchor agitator was used for mixing. Examples 21, 22, 25 and 26 shows that larger particle sizes can be made at higher polymerization rates using the anchor agitator for mixing. However, these conditions are not useful since the reactor plugged with gel.

Examples 27 to 31 show the dependence of particle size and reaction rate on auger agitator speed. Large particle sizes were produced under stable reaction conditions (as judged by the absence of gel in the reactor). The utility of the agitator is further illustrated by example 32. In this experiment a large particle size resin was produced and the reactor operated stably at high polymerization rates for a long period of time.

Example four illustrates the utility of the auger agitator for generating large particle size resins in a stirred plug flow reactor under commercially useful polymerization conditions.

Overall, the data in the examples listed above demonstrates the utility of the auger agitator for the production of impact modified thermoplastic resins with large rubber particle sizes. This is because the auger agitator inputs low shear stress to syrup, provides good mixing and eliminates stagnant regions in the reactor. The auger agitator fills the entire reactor volume and has a smooth surface, which greatly reduces the possibility of build up forming.

TABLE V

EXPERIMENTAL CONDITIONS FOR EXAMPLE IV

| Run Number | Agitator Speed/Type/Wall Clearance | Feed Rate (ml/hr) | Feed Composition | | | Oil Jacket Temp. (° C.) |
|---|---|---|---|---|---|---|
| | | | Rubber (%) | Type | Min. Oil (%) | Initiation Type | |
| 20 | 20/Anchor/0.125 | 435 | 8 | T-550 | 0.5 | Ther. | 125.0 |
| 21 | 20/Anchor/0.125 | 435 | 8 | T-550 | 0.5 | Ther. | 130.0 |
| 22 | 40/Anchor/0.125 | 435 | 8 | T-550 | 0.5 | Ther. | 130.0 |
| 24 | 30/Anchor/0.25 | 435 | 8 | T-550 | 0.5 | Ther. | 125.0 |
| 25 | 30/Anchor/0.25 | 435 | 8 | T-550 | 0.5 | Ther. | 130.0 |
| 26 | 40/Anchor/0.25 | 435 | 8 | T-550 | 0.5 | Ther. | 130.0 |
| 27 | 15/Auger/0.125 | 652 | 6 | T-550 | 0 | Ther. | 130.0 |
| 28 | 30/Auger/0.125 | 652 | 6 | T-550 | 0 | Ther. | 130.0 |
| 29 | 45/Auger/0.125 | 652 | 6 | T-550 | 0 | Ther. | 130.0 |
| 30 | 60/Auger/0.125 | 652 | 6 | T-550 | 0 | Ther. | 130.0 |
| 31 | 120/Auger/0.125 | 652 | 6 | T-550 | 0 | Ther. | 130.0 |
| 32 | 30/Auger/0.125 | 876 | 6.5 | T-550 | 0 | Ther. | 135.0 |

TABLE VI

EXPERIMENTAL RESULTS FOR EXAMPLE IV

| Run Number | Batch Temp. (° C.) | Solids (%) | Gel In Reactor (yes/no) | Reaction Rate (%/hr) | Sample Prep. | Particle Size Test Method | $\mu M$ |
|---|---|---|---|---|---|---|---|
| 20 | 122 | 24.60 | no | 7.2 | Tube | Ph. Sed. | 5.3 |
| 21 | 131 | 35.60 | yes | 12.0 | Tube | Ph. Sed. | 6.3 |
| 22 | 132 | 36.77 | yes | 12.5 | Tube | Ph. Sed. | 4.0 |
| 24 | 120 | 22.82 | no | 6.9 | Tube | Ph. Sed. | 5.3 |
| 25 | 137 | 46.96 | yes | 16.9 | Tube | Ph. Sed. | 7.4 |
| 26 | 140 | 54.41 | yes | 20.2 | Tube | Ph. Sed. | 6.4 |
| 27 | 133.9 | 31.98 | no | 19.38 | Tube | Ph. Sed. | 11.9 |
| 28 | 132.0 | 28.34 | no | 16.76 | Tube | Ph. Sed. | 8.8 |
| 29 | 131.5 | 26.75 | no | 15.61 | Tube | Ph. Sed. | 7.3 |
| 30 | 131.3 | 25.24 | no | 14.51 | Tube | Ph. Sed. | 5.9 |
| 31 | 131.0 | 24.91 | no | 14.26 | Tube | Ph. Sed. | 4.4 |
| 32 | 138.0 | 32.04 | no | 26.69 | Process | Ph. Sed. | 9.1 |

To those skilled in the art it is well known that particle size is affected by many interacting variables. For example, It is possible to increase rubber particle size by adding chain transfer agents to a polymerization. These agents lower the polystyrene molecular weight, which can negatively affect other properties. Also, it is undesirable to add these agents to a continuous process since they can lower productivity and/or build up in the process. Further, for a given polymerization system, the auger agitator (versus the use of other agitator designs) should produce the largest particle size resin.

What is claimed is:

1. A process to produce a syrup comprising a continuous phase of one or more monomers selected from the group consisting of $C_{8-12}$ vinyl aromatic monomers which are unsubstituted or substituted by a $C_{1-4}$ alkyl radical, $C_{1-8}$ alkyl esters of acrylic or methacrylic acid, maleic anhydride, acrylonitrile and methacrylonitrile and polymer formed therefrom and from 1 to 20 weight % of a polymer which forms a discontinuous phase having a volume average diameter of at least 6 micrometers, selected from the group consisting of:

(i) co- or homopolymers of $C_{4-6}$ conjugated diolefins;

(ii) random, block and tapered copolymers comprising from 10 to 80 weight % of one or more $C_{8-12}$ vinyl aromatic monomers which are unsubstituted or substituted by a $C_{1-4}$ alkyl radical, and from 20 to 90 weight % of one or more $C_{4-6}$ conjugated diolefins; and (iii) copolymers comprising from 5 to 50 weight % of acrylonitrile or methacrylonitrile, and from 50 to 95 weight % of one or more $C_{4-6}$ conjugated diolefins, which comprises dissolving the polymers forming the discontinuous phase in one or more of the monomers forming the continuous phase and polymerizing the resulting syrup under low shear to a percent conversion greater than the weight % of the polymer forming the discontinuous phase in said solution but less than 75% conversion to cause phase inversion and separation of the discontinuous phase in a reactor selected from the group consisting of continuous stirred tank reactors, continuous stirred loop reactors and stirred plug flow reactors wherein the agitation in said reactor consists solely of an auger agitator, in the absence of a draft tube, said auger having a shaft forming from ½ to ¹⁄₂₀ of the cross section area of the agitator and flights forming the balance of the cross section area, said flights having a pitch defined by the equation $\alpha°=\mathrm{Tan}^{-1}\ 0.5\ p/d$ wherein p is the pitch distance and d is the screw diameter.

2. The process according to claim 1, wherein the polymer which forms the discontinuous phase is present in an amount from 3 to 12 weight % based on the weight of said syrup.

3. The process according to claim 2, wherein said continuous phase comprises one or more monomers selected from the group consisting of styrene, alpha methyl styrene, paramethyl styrene, p-t-butyl styrene, methyl methacrylate, ethyl acrylate, butyl acrylate, acrylonitrile, methacrylonitrile, and maleic anhydride.

4. The process according to claim 3 wherein the discontinuous phase is selected from the group consisting of polybutadiene rubber, styrene-butadiene rubber and nitrile rubber.

5. The process according to claim 4, wherein the conversion is less than 40%.

6. The process according to claim 5 wherein said flights have a pitch from 5° to 45°.

7. The process according to claim 6, wherein said reactor is a continuous stirred tank reactor.

8. The process according to claim 6, wherein said reactor is a stirred plug flow reactor.

9. The process according to claim 6, wherein said reactor is a continuous stirred loop reactor.

10. The process according to claim 7, wherein said continuous phase is styrene and said discontinuous phase is polybutadiene rubber.

11. The process according to claim 8, wherein said continuous phase is styrene and said discontinuous phase is polybutadiene rubber.

12. The process according to claim 9, wherein said continuous phase is styrene and said discontinuous phase is polybutadiene rubber.

* * * * *